US012640162B2

(12) United States Patent
Garg et al.

(10) Patent No.: US 12,640,162 B2
(45) Date of Patent: **\*May 26, 2026**

(54) SYSTEM AND METHOD FOR PODCAST REPETITIVE CONTENT DETECTION

(71) Applicant: Gracenote, Inc., Emeryville, CA (US)

(72) Inventors: Amanmeet Garg, Sunnyvale, CA (US); Aneesh Vartakavi, Emeryville, CA (US)

(73) Assignee: Gracenote, Inc., Emeryville, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/405,269

(22) Filed: Jan. 5, 2024

(65) Prior Publication Data

US 2024/0233747 A1    Jul. 11, 2024

Related U.S. Application Data

(63) Continuation of application No. 17/117,479, filed on Dec. 10, 2020, now Pat. No. 11,922,967.

(Continued)

(51) Int. Cl.
*G10L 25/51*        (2013.01)
*G10L 17/02*        (2013.01)
(Continued)

(52) U.S. Cl.
CPC .............. *G10L 25/51* (2013.01); *G10L 17/02* (2013.01); *G10L 17/06* (2013.01); *G10L 25/90* (2013.01)

(58) Field of Classification Search
CPC ......... G10L 25/51; G10L 17/02; G10L 17/06; G10L 25/90
See application file for complete search history.

(56) References Cited

U.S. PATENT DOCUMENTS 8,484,017 B1 \*    7/2013    Sharifi .................... G10L 19/00
                                                                704/226
2007/0124144 A1 \*    5/2007    Johnson .................. H04W 4/90
                                                                455/563

(Continued)

FOREIGN PATENT DOCUMENTS

KR    10-2008-0073357 A    8/2008
KR    10-2018-0026377 A    3/2018

OTHER PUBLICATIONS

Vartakavi et al., "PodSumm: Podcast Audio Summarization", published Sep. 22, 2020, https://arxiv.org/abs/2009.10315.
International Search Report and Written Opinion for PCT/US2021/050311 issued on Dec. 29, 2021.

*Primary Examiner* — Richemond Dorvil
*Assistant Examiner* — Ethan Daniel Kim
(74) *Attorney, Agent, or Firm* — McDonnell Boehnen Hulbert & Berghoff LLP

(57)        ABSTRACT

In one aspect, a method includes detecting a fingerprint match between query fingerprint data representing at least one audio segment within podcast content and reference fingerprint data representing known repetitive content within other podcast content, detecting a feature match between a set of audio features across multiple time-windows of the podcast content, and detecting a text match between at least one query text sentences from a transcript of the podcast content and reference text sentences, the reference text sentences comprising text sentences from the known repetitive content within the other podcast content. The method also includes responsive to the detections, generating sets of labels identifying potential repetitive content within the podcast content. The method also includes selecting, from the sets of labels, a consolidated set of labels identifying segments of repetitive content within (Continued)

Repetitive Content Detection System — 100

Fingerprint Matching System — 104

Audio Processing Module — 102

Audio Feature Matching System — 106

Repetitive Content Consolidation Module — 110

Text Matching System — 108 the podcast content, and responsive to selecting the consolidated set of labels, performing an action.

20 Claims, 8 Drawing Sheets

Related U.S. Application Data

(60) Provisional application No. 63/089,078, filed on Oct. 8, 2020.

(51) Int. Cl.
G10L 17/06 (2013.01)
G10L 25/90 (2013.01)

(56) References Cited

U.S. PATENT DOCUMENTS

| | | | |
|---|---|---|---|
| 2009/0205000 A1* | 8/2009 | Christensen | H04N 21/2665 |
| | | | 725/115 |
| 2010/0100899 A1* | 4/2010 | Bradbury | H04N 21/4431 |
| | | | 725/39 |
| 2011/0043652 A1* | 2/2011 | King | G06F 40/194 |
| | | | 707/706 |
| 2011/0213655 A1* | 9/2011 | Henkin | G06Q 30/00 |
| | | | 707/E17.061 |
| 2014/0044355 A1 | 2/2014 | Haritaoglu | |
| 2016/0372139 A1 | 12/2016 | Cho et al. | |
| 2017/0188070 A1* | 6/2017 | Abed | H04N 21/4348 |
| 2019/0138549 A1 | 5/2019 | Oztaskent et al. | |
| 2021/0357451 A1* | 11/2021 | Wold | G10L 15/187 |

* cited by examiner

400

402  Receiving podcast content

404  Identifying potential repetitive content within the podcast content by performing two or more of a first set of acts, a second set of acts, or a third set of acts, where:

the first set of acts comprises:
 detecting a fingerprint match between query fingerprint data representing at least one audio segment within the podcast content and reference fingerprint data representing known repetitive content within other podcast content, the other podcast content being different from the podcast content, where the known repetitive content comprises content segments that repeatedly appear in the other podcast content, and
 responsive to detecting the fingerprint match, generating a first set of labels identifying the at least one audio segment as potential repetitive content within the podcast content, the second set of acts comprises:
 for each of a plurality of time-windows of the podcast content, determining a set of audio features, where each of the sets of audio features include the same audio feature types,
 detecting a feature match between the set of audio features of at least one time-window of the plurality of time-windows and the set of audio features of at least one other time-window of the plurality of time-windows, and
 responsive to detecting the feature match, generating a second set of labels identifying the at least one time-window as potential repetitive content within the podcast content, and the third set of acts comprises:
 generating a transcript of at least a portion of the podcast content, dividing the generated transcript into query text sentences,
 detecting a text match between at least one of the query text sentences and reference text sentences, the reference text sentences comprising text sentences from the known repetitive content within the other podcast content, and
 responsive to detecting the text match, generating a third set of labels identifying at least one audio segment of the podcast content that corresponds to the at least one of the query text sentences as potential repetitive content within the podcast content

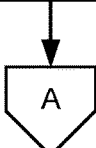
A

Figure 4A

406 Selecting, from two or more of the first set of labels, the second set of labels, or the third set of labels, a consolidated set of labels identifying segments of repetitive content within the podcast content 408 Responsive to selecting the consolidated set of labels, performing an action

SYSTEM AND METHOD FOR PODCAST REPETITIVE CONTENT DETECTION

RELATED DISCLOSURES

This application is a non-provisional application claiming priority to U.S. application Ser. No. 17/117,479, filed on Dec. 10, 2020, which claims priority to U.S. Provisional Pat. App. No. 63/089,078 filed Oct. 8, 2020, the full disclosures of both of which are hereby incorporated by reference herein.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, a method is disclosed. The method includes receiving podcast content. The method also includes identifying potential repetitive content within the podcast content by performing two or more of a first set of acts, a second set of acts, or a third set of acts. The first set of acts includes detecting a fingerprint match between query fingerprint data representing at least one audio segment within the podcast content and reference fingerprint data representing known repetitive content within other podcast content, the other podcast content being different from the podcast content, where the known repetitive content comprises content segments that repeatedly appear in the other podcast content. The first set of acts also includes responsive to detecting the fingerprint match, generating a first set of labels identifying the at least one audio segment as potential repetitive content within the podcast content. The second set of acts includes for each of a plurality of time-windows of the podcast content, determining a set of audio features, where each of the sets of audio features include the same audio feature types. The second set of acts also includes detecting a feature match between the set of audio features of at least one time-window of the plurality of time-windows and the set of audio features of at least one other time-window of the plurality of time-windows. The second set of acts also includes responsive to detecting the feature match, generating a second set of labels identifying the at least one time-window as potential repetitive content within the podcast content. The third set of acts includes generating a transcript of at least a portion of the podcast content. The third set of acts also includes dividing the generated transcript into query text sentences. The third set of acts also includes detecting a text match between at least one of the query text sentences and reference text sentences, the reference text sentences comprising text sentences from the known repetitive content within the other podcast content. The third set of acts also includes responsive to detecting the text match, generating a third set of labels identifying at least one audio segment of the podcast content that corresponds to the at least one of the query text sentences as potential repetitive content within the podcast content. The method also includes selecting, from two or more of the first set of labels, the second set of labels, or the third set of labels, a consolidated set of labels identifying segments of repetitive content within the podcast content. The method also includes responsive to selecting the consolidated set of labels, performing an action.

In another aspect, a non-transitory computer-readable storage medium has stored thereon program instructions that, upon execution by a processor, cause performance of a set of operations. The set of operations includes receiving podcast content. The set of operations also includes identifying potential repetitive content within the podcast content by performing two or more of a first set of acts, a second set of acts, or a third set of acts. The first set of acts includes detecting a fingerprint match between query fingerprint data representing at least one audio segment within the podcast content and reference fingerprint data representing known repetitive content within other podcast content, the other podcast content being different from the podcast content, where the known repetitive content comprises content segments that repeatedly appear in the other podcast content. The first set of acts also includes responsive to detecting the fingerprint match, generating a first set of labels identifying the at least one audio segment as potential repetitive content within the podcast content. The second set of acts includes for each of a plurality of time-windows of the podcast content, determining a set of audio features, where each of the sets of audio features include the same audio feature types. The second set of acts also includes detecting a feature match between the set of audio features of at least one time-window of the plurality of time-windows and the set of audio features of at least one other time-window of the plurality of time-windows. The second set of acts also includes responsive to detecting the feature match, generating a second set of labels identifying the at least one time-window as potential repetitive content within the podcast content. The third set of acts includes generating a transcript of at least a portion of the podcast content. The third set of acts also includes dividing the generated transcript into query text sentences. The third set of acts also includes detecting a text match between at least one of the query text sentences and reference text sentences, the reference text sentences comprising text sentences from the known repetitive content within the other podcast content. The third set of acts also includes responsive to detecting the text match, generating a third set of labels identifying at least one audio segment of the podcast content that corresponds to the at least one of the query text sentences as potential repetitive content within the podcast content. The set of operations also includes selecting, from two or more of the first set of labels, the second set of labels, or the third set of labels, a consolidated set of labels identifying segments of repetitive content within the podcast content. The set of operations also includes responsive to selecting the consolidated set of labels, performing an action.

In another aspect, a computing system includes a processor and a non-transitory computer-readable storage medium, having stored thereon program instructions that, upon execution by the processor, cause performance of a set of operations. The set of operations includes receiving podcast content. The set of operations also includes identifying potential repetitive content within the podcast content by performing two or more of a first set of acts, a second set of acts, or a third set of acts. The first set of acts includes detecting a fingerprint match between query fingerprint data representing at least one audio segment within the podcast content and reference fingerprint data representing known repetitive content within other podcast content, the other podcast content being different from the podcast content, where the known repetitive content comprises content segments that repeatedly appear in the other podcast content. The first set of acts also includes responsive to detecting the fingerprint match, generating a first set of labels identifying the at least one audio segment as potential repetitive content within the podcast content. The second set of acts includes for each of a plurality of time-windows of the podcast content, determining a set of audio features, where each of the sets of audio features include the same audio feature types. The second set of acts also includes detecting a feature match between the set of audio features of at least one time-window of the plurality of time-windows and the set of audio features of at least one other time-window of the plurality of time-windows. The second set of acts also includes responsive to detecting the feature match, generating a second set of labels identifying the at least one time-window as potential repetitive content within the podcast content. The third set of acts includes generating a transcript of at least a portion of the podcast content. The third set of acts also includes dividing the generated transcript into query text sentences. The third set of acts also includes detecting a text match between at least one of the query text sentences and reference text sentences, the reference text sentences comprising text sentences from the known repetitive content within the other podcast content. The third set of acts also includes responsive to detecting the text match, generating a third set of labels identifying at least one audio segment of the podcast content that corresponds to the at least one of the query text sentences as potential repetitive content within the podcast content. The set of operations also includes selecting, from two or more of the first set of labels, the second set of labels, or the third set of labels, a consolidated set of labels identifying segments of repetitive content within the podcast content. The set of operations also includes responsive to selecting the consolidated set of labels, performing an action.

BRIEF DESCRIPTION OF THE DRAWINGS

FIG. 4A is a flow chart of an example method.

DETAILED DESCRIPTION

I. Overview

Figure 1:
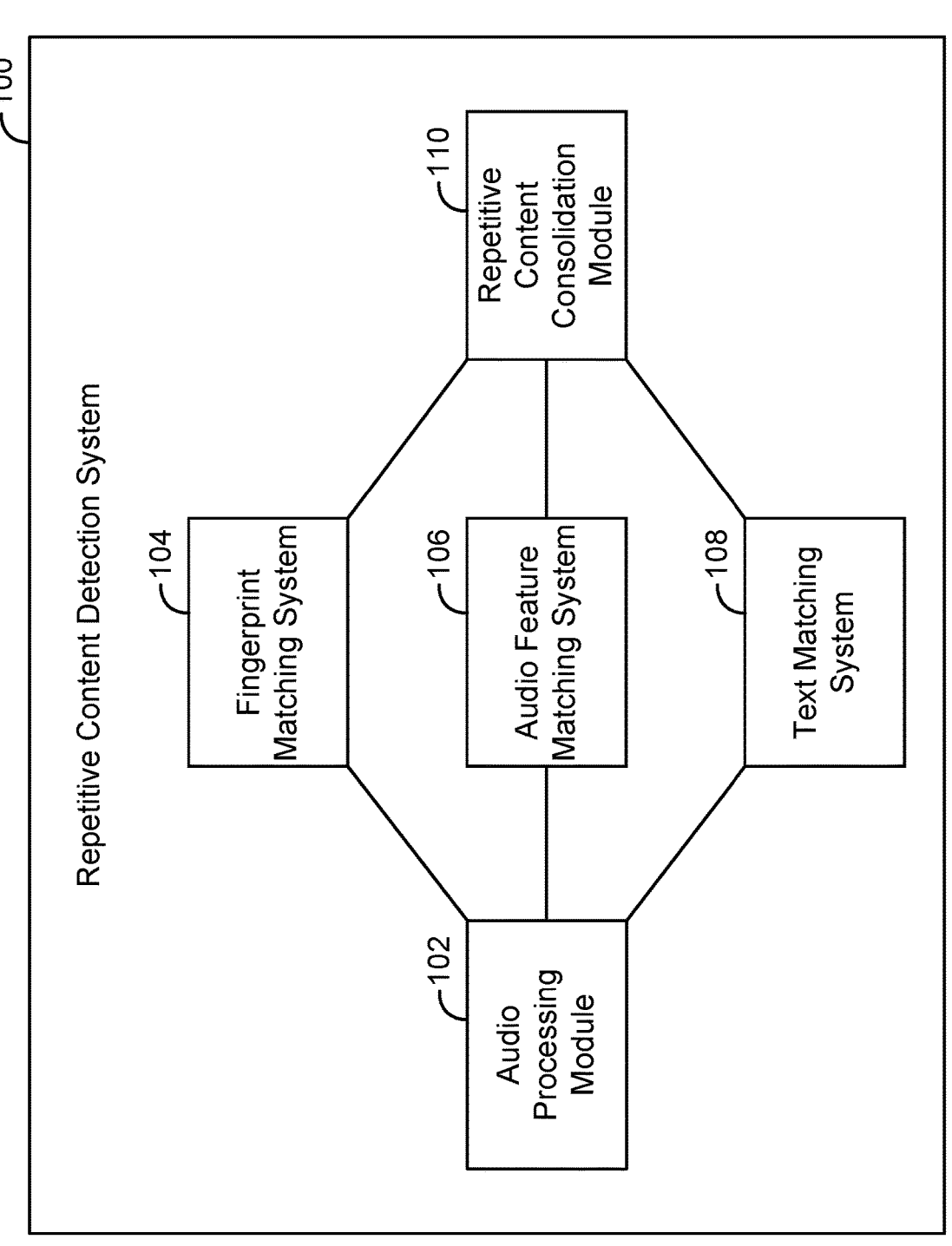
FIG. 1 is a simplified block diagram illustrating an example repetitive content detection system in which various described principles can be implemented.

A content distribution system, such as a server, can be configured to maintain and provide access to podcast content (e.g., podcast files) over a web feed, such as RDF Site Summary (RSS). In turn, an end-user can use a web browser or another type of software application installed on a client device to download or stream the podcast content from the content distribution system. As an example, the podcast content can take the form of a digital audio file recording of a spoken word podcast "episode."

In many situations, podcast episodes include repetitive content. Repetitive content, in this context, refers to portions of podcast content that repeatedly appear in a single podcast episode, across multiple related podcast episodes (e.g., a podcast series), or across multiple podcast episodes that are not in the same series but that might or might not be related in some other way (e.g., podcasts that are targeted to a specific geographic location or demographic). Examples of repetitive content include advertisements, musical themes such as those that typically appear near the beginning or end of the podcast, and/or spoken phrases such as those that typically begin or end the podcast (e.g., "Hello! You're listening to Podcast X. I am your host, Host Y.") or those that take the form of taglines and announcements. In addition, some repetitive content can blend speech and music, such as a tagline being spoken over background music. Repetitive content can also appear at locations other than the beginning or end of the podcast content (e.g., an advertisement appearing at the 7-minute mark of a 30 minute podcast).

Repetitive content can appear in more predictable locations within podcast content, such as at the beginning of the podcast, midway through the podcast, a particular defined intervals (e.g., every n minutes), or at the end of the podcast. In some cases, however, repetitive content such as advertisements might be creatively incorporated into the rest of the podcast content, such as into a story being told by a host of the podcast, thus making the location of such content less easily detectable.

Furthermore, repetitive content such as an advertisement can be added into podcast content before the podcast content is made available to end-users. In other cases, the content distribution system or other system might dynamically add the repetitive content into the podcast content while the podcast content is being streamed and/or might modify (e.g., replace or supplement) existing repetitive content in the podcast content with other repetitive content, such as replacing one advertisement with another depending on when and where the podcast content is being downloaded or streamed.

Detecting repetitive content within podcast content can be desirable for other reasons as well. For example, a podcast creator or other entity might seek to measure the effectiveness of advertising campaigns on podcast networks, thus enabling insights into how much an advertisement is listened to, how relevant the advertisement is to the podcast content in which the advertisement was included, and/or other information. As another example, the content distribution system or other system might ignore or remove repetitive content, such as when categorizing podcast episodes by topic or generating other data from the podcast content. Other examples are possible as well.

Some existing systems for detecting repetitive content incorporate computationally-expensive, supervised machine learning that requires large amounts of training data. Other existing systems for detecting repetitive content rely only on conventional fingerprinting techniques, which can detect some forms of repetitive content, but can miss other forms of repetitive content. Existing systems also typically operate in a single data domain, such as audio, text, or another domain, which can make it difficult for such systems to identify repetitive content, particularly when portions of the podcast content includes overlapping speech, music, multi-party speech, or other overlapping media.

Accordingly, the present disclosure provides an improved repetitive content detection system that implements text matching, audio feature matching, and fingerprint matching processes to detect potential repetitive content in podcast content. The disclosed repetitive content detection system also consolidates the outputs from the three processes and, from those outputs, confidently detects the repetitive content in the podcast content, such as by identifying which segments and corresponding timestamps in the podcast content correspond to repetitive content).

By operating in both the text and audio domain, as well as by implementing specific subsystems for text matching, audio feature matching, and fingerprint matching, the disclosed repetitive content detection system can efficiently and confidently detect different forms of repetitive content. For example, when two or more of the three subsystems detect the same repetitive content, the disclosed repetitive content detection system can indicate that such repetitive content was detected at high confidence.

In another example, one or more of the three subsystems might be better suited to detect certain forms of repetitive content that one or more others of the three subsystems might be less suited to detect. As a more particular example, the text matching subsystem might detect when two different speakers say the same tagline, whereas the fingerprint matching subsystem might only detect a repeating tagline when the same speaker speaks the tagline. As another particular example, the fingerprint matching subsystem might more confidently detect when an advertisement in the podcast content is the exact same advertisement from other podcast content than the audio feature matching subsystem or the text matching subsystem. As yet another particular example, text matching and audio feature matching can be more effective than fingerprint matching in confidently detecting spoken repetitive content that is played over various different background music themes, because fingerprints of the spoken repetitive content over one background song will not match the fingerprints of the same spoken repetitive content over a different background song.

Furthermore, the disclosed repetitive content detection system can also be usefully implemented in other podcast systems as well, such as a podcast summarization system that is configured to intelligently generate, and then deliver to a client device (e.g., smartphone, laptop computer, etc. operated by an end-user), an audio and/or text summary or preview of podcast content. For example, the disclosed repetitive content detection system can detect segments of repetitive content in the podcast content so that the podcast summarization system can remove or disregard such segments, so as not to include them in the generated summary or preview, thus improving user experience. The term "summary," in this context, refers to a summarization of what happens in the entirety of the podcast content, possibly revealing important information such as "spoilers" (e.g., surprise speakers or unexpected plot developments). The term "preview," in this context, refers to a teaser of a portion of the content of the podcast content and typically does not reveal important information or other information that might be deemed as a "spoiler."

Additionally, the disclosed repetitive content detection system can operate unsupervised, or can optionally include supervised machine learning, such as machine learning to improve the manner in which the system consolidates the outputs from the three subsystems. For example, the audio feature matching subsystem can be trained (e.g., with a database of known references approved by human operators) to distinguish between, and classify, different types of content, such as advertisements or non-advertisement content, and/or the fingerprint matching subsystem can maintain and use a known database of advertisements that is verified by human operators.

II. Architecture

A. Repetitive Content Detection System

FIG. 1 is a simplified block diagram illustrating an example repetitive content detection system 100 in which various described principles can be implemented. The repetitive content detection system 100 can include various components, such as an audio processing module 102, a fingerprint matching subsystem 104, an audio feature matching subsystem 106, a text matching subsystem 108, and a repetitive content consolidation module 110. Each subsystem can be or included as part of a computing system, an example of which is described in FIG. 2. As such, the repetitive content detection system 100 can be made up of a plurality of such computing systems and/or modules. Further, each subsystem can be or include one or more modules. In the context of the present disclosure, a module can take the form of computer program logic that is executable by a computing system. In this context, computer program logic can be or include machine learning logic and/or one or more algorithms that facilitate the performance of the operations described herein. In alternative embodiments, the audio processing module 102 and the repetitive content consolidation module 110 can each be, or each be included as part of, a computing system.

The repetitive content detection system 100 can also include one or more connection mechanisms that connect various modules within the repetitive content detection system 100. For example, the repetitive content detection system 100 can include the connection mechanisms represented by lines connecting components of the repetitive content detection system 100, as shown in FIG. 1.

In this disclosure, the term "connection mechanism" means a mechanism that connects and facilitates communication between two or more modules, components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

In some examples, the repetitive content detection system 100 can be, or can be included as part of, a computing system such as a content distribution system (e.g., a server that maintains podcast content) or a client device (e.g., an end-user's smartphone or laptop computer).

In some examples, the repetitive content detection system 100, as well as other computing systems that are associated with repetitive content, can be configured to label, classify, interpret, or otherwise treat a segment of audio or text as a "repetitive content" segment unless the segment has met one or more established conditions. As an example, one such condition can be that the segment has appeared in (e.g., as initially part of the podcast content, or as the result of dynamic advertisement insertion) a total number of podcast episodes that exceeds a threshold quantity of episodes, regardless of whether such podcast episodes are part of the same series or otherwise related. Another such condition can be that the segment has appeared in (e.g., as initially part of the podcast content, or as the result of dynamic advertisement insertion) a number of podcast episodes of the same series that exceeds a threshold quantity of episodes. Other example conditions are possible as well.

B. Computing System

Figure 2:
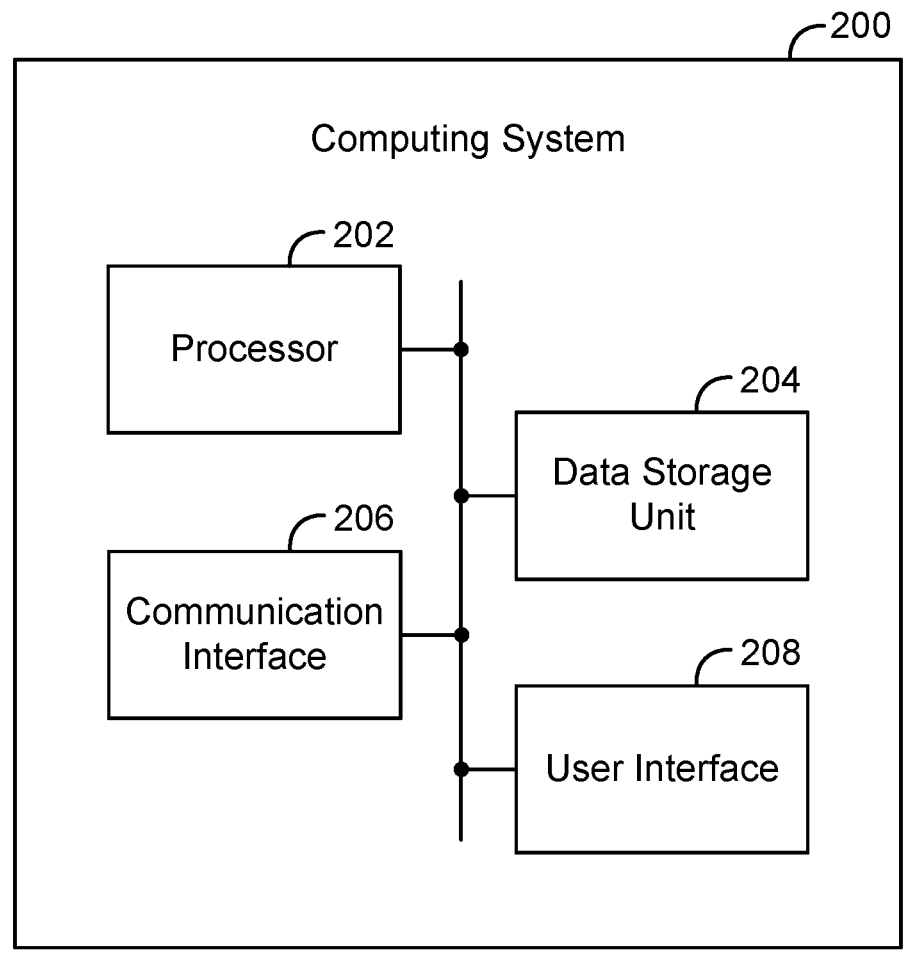
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the repetitive content detection system 100 and/or modules thereof can take the form of a computing system, such as the computing system 200. In some cases, some or all these entities can take the form of a more specific type of computing system.

III. Example Podcast Summarization System Operations

The repetitive content detection system 100 and/or modules thereof can be configured to perform and/or can perform one or more operations. Examples of these operations and related features will now be described with respect to FIGS. 3A-3D.

In practice, it is likely that at least some of described operations will be performed many times (perhaps on a routine basis).

Figure 3A:
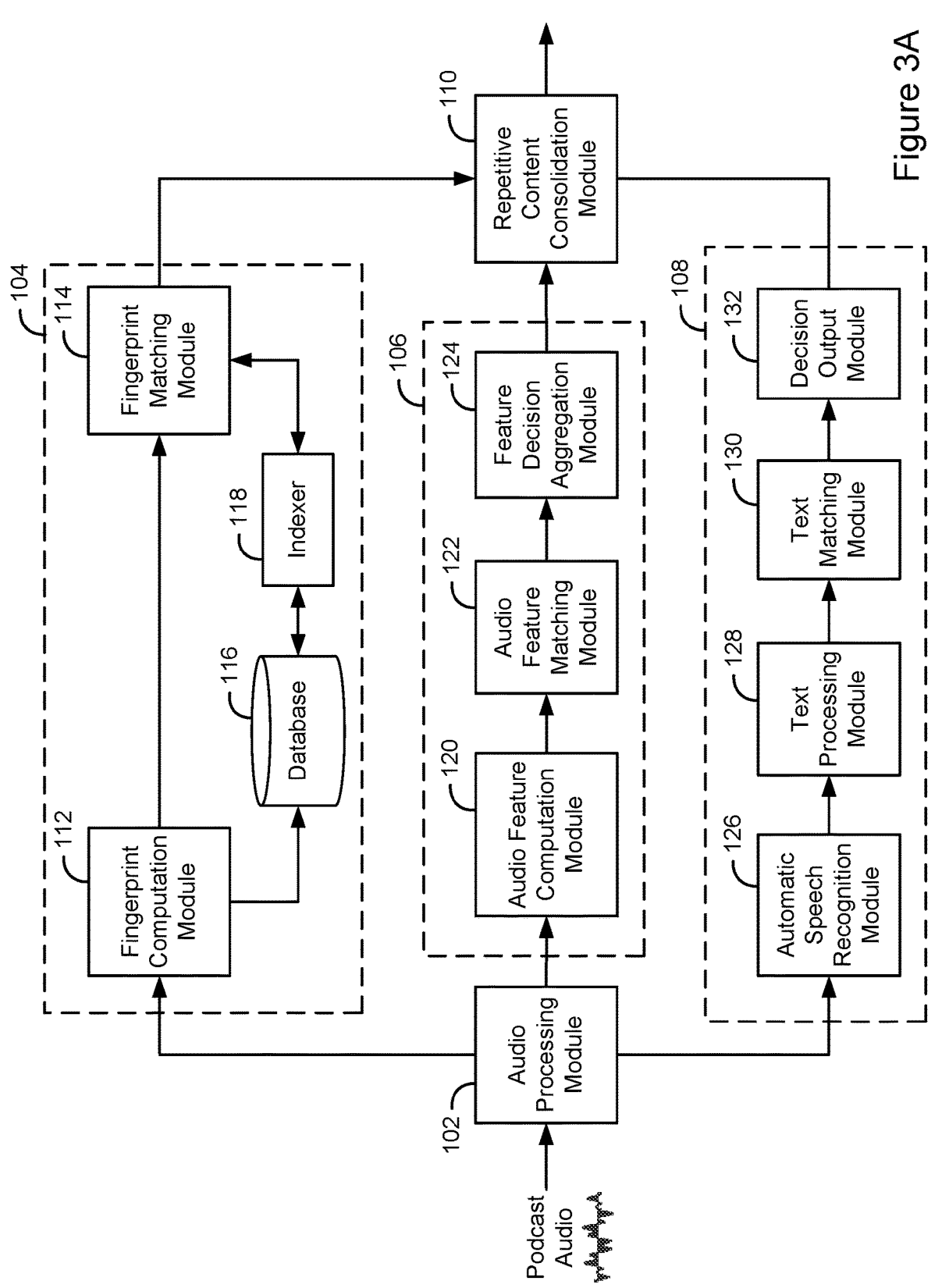
FIG. 3A illustrates example operations performed by the repetitive content detection system of FIG. 1.

FIG. 3A illustrates example operations performed by the repetitive content detection system 100.

FIG. 3A also illustrates modules and other components of the subsystems of the repetitive content detection system 100—that is, the fingerprint matching subsystem 104, the audio feature matching subsystem 106, and the text matching subsystem 108. As shown, the fingerprint matching subsystem 104 can include various components, such as a fingerprint computation module 112, a fingerprint matching module 114, a database 116, and an indexer 118. The audio feature matching subsystem 106 can include various components as well, such as an audio feature computation module 120, an audio feature matching module 122, and a feature decision aggregation module 124. Further, the text matching subsystem 108 can include various components, such as an automatic speech recognition (ASR) module 126, a text processing module 128, a text matching module 130, and a decision output module 132.

Any two or more of such modules might be combined into a single module, in some examples. For instance, the text matching module 130 and the decision output module 132 of the text matching subsystem 108 can be or include a single module.

As shown in FIG. 3A, the audio processing module 102 can receive podcast content comprising the audio of a podcast episode.

Upon receipt of the podcast content, the audio processing module 102 can perform various pre-processing operations relative to the podcast content before sending the podcast content to the fingerprint matching subsystem 104, the audio feature matching subsystem 106, and the text matching subsystem 108. Examples of such pre-processing operations are described below.

In some examples, the audio processing module 102 can parse the podcast content to identify audio segments (hereinafter, "segments," for brevity) of music, speech, and/or other potential classes of segments in the podcast content. Upon identifying a particular segment, an audio classifier of the audio processing module 104 can store in memory a label for that segment, such as "music" or "speech."

In some scenarios, segments might include both speech and music, such as when a host of the podcast is talking over an introductory music theme, or when a song is playing and has lyrics that are sung or spoken. In some embodiments, the audio processing module 102 can label such segments with a specialized label (e.g., "music and speech" or "song"). In other embodiments, the audio processing module 104 can label such segments by default as music, rather than speech. Alternatively, the audio processing module 102 can label such segments as speech. In some scenarios, however, the audio processing module 102 might not be able to determine a label for a particular segment, and thus might not assign any such label.

In some examples, the audio processing module 102 can identify the speaker for speech segments and determines sentence offsets and segment offsets. The audio processing module 102 can also identify portions of the podcast episode when there is a transition in the flow of audio and/or in the flow of information in the audio and to distinguish between the different types of transitions. For example, the audio processing module 102 can be configured to label certain transitions as a "break" or a "pause," such as when a speaker stops speaking for more than two seconds and then the same speaker resumes speaking (e.g., between words in the middle of a spoken sentence, or between two sentences), or when a song briefly pauses between a verse and a chorus. For brevity, the term "pause" will be used herein to collectively refer to these and other types of transitions in the audio of the podcast content. It should be understood, however, that in some examples, a "break" can be defined as a different type of transition than a "pause," and the audio processing module 102 can be configured to distinguish between these and other types of transitions. For instance, breaks or pauses in sentences can occur where a comma, period, semicolon, colon, question mark, or exclamation point might typically be placed when writing such sentences. As another example, the audio processing module 102 can be configured to provide a different label for pauses between two different speakers and/or between speech and music.

In some examples, the audio processing module 102 can be configured to determine that a pause has occurred when the audio processing module 102 detects at least a threshold time gap (e.g., three seconds) exists between continuous speech. In other examples, the audio processing module 102 can use machine learning that can, over time and across training data sets of various podcast content, determine and update the threshold time gap and thus enable the audio processing module 102 to more efficiently recognize when a pause has occurred. In still other examples, the audio processing module 102 can be configured to map certain pause detection thresholds with certain speakers as the repetitive content detection system 100 learns different speaking styles. For example, different speakers (even within the same episode) may have a different style and rate of speaking, and some may pause longer than others. Thus, the audio processing module 102, upon recognizing that a certain speaker is speaking, can select a threshold for that speaker and determine that, during a segment in which that speaker is speaking, a pause has occurred when that threshold time has elapsed with no speaking or music.

In some situations, the audio processing module 102 can also receive metadata associated with the podcast content. The metadata can identify, among other things, a content provider associated with the podcast content, a title of the podcast (e.g., the name shared by a series of podcast episodes) with which the podcast content is associated, a host or hosts of the podcast episode, and/or a title of the podcast episode.

In some cases, the metadata might identify known segments of the podcast content and any labels, timestamps, or other known information associated with the segments. For example, the metadata might include timestamps of known segments of repetitive content, such as when it is known that the podcast content is from a series of episodes that are known to each begin with a 20-second introductory advertisement or musical theme. In response to receiving metadata that identifies known repetitive content in this way, the audio processing module 102 can perform various operations, such as removing segments of repetitive content from the podcast content (e.g., deleting a portion of the audio file) or labeling the segment as repetitive content. Further, if the type of repetitive content is known and identified by the metadata, the audio processing module 102 might take action to label the type of segment of repetitive content (e.g., a label indicating whether the segment is an advertisement, tagline, introductory music theme, etc.). Other operations are possible as well.

In the context of labeling a segment as repetitive content, a label can take various forms, such as a binary indicator of whether the segment is repetitive content. Additionally or alternatively, the label can be or include a value that computing devices are configured to interpret as an indication of a particular type of repetitive content.

Additionally or alternatively to the operations described above, the audio processing module 102 can perform other operations, such as modulating the podcast content (e.g., altering the amplitude, frequency, or other parameter of the audio file).

The audio processing module 102 can then send the podcast content to the fingerprint matching subsystem 104, the audio feature matching subsystem 106, and the text matching subsystem 108. The podcast content can be sent as a single file or in multiple portions.

Operations for each of the fingerprint matching subsystem 104, the audio feature matching subsystem 106, and the text matching subsystem 108 will now be described in more detail. In some examples, the fingerprint matching subsystem 104, the audio feature matching subsystem 106, and the text matching subsystem 108 can each perform respective operations in parallel, which can make the repetitive content detection process less time consuming.

A. Fingerprint Matching Subsystem

Upon receiving the podcast content, the fingerprint computation module 112 can generate fingerprint data including one or more fingerprints of the podcast content as a whole and/or segments thereof. Herein, the fingerprint data generated from the podcast content that the repetitive content detection system is currently processing (compared with previously-processed podcast content) is referred to as "query fingerprint data." The fingerprint computation module 112 can generate the query fingerprint data using any content fingerprinting process now known or later developed. An example fingerprint generation technique is described in U.S. Pat. No. 9,495,451 issued Nov. 15, 2016, the entirety of which is hereby incorporated by reference herein. The fingerprint computation module 112 can then send the fingerprint data to the fingerprint matching module 114.

The fingerprint computation module 112 can also send the query fingerprint data to be stored in the database 116. The database 116 can also store reference fingerprint data representing other podcast episodes, segments of podcast episodes, and/or other podcast content. For example, the database 116 can store reference fingerprint data including fingerprints that represent previously-detected repetitive content. In some situations, the database 116 can identify the type or subject matter of the repetitive content to which the reference fingerprint data corresponds, if such information is known. For instance, the database 116 can store fingerprint data representing a segment of repetitive content that has been included as part of each of a series of podcast episodes over the last month. Further, if the segment of repetitive content is known to be an advertisement, the database 116 might include a label that identifies the repetitive content and corresponding fingerprint data as such. The database 116 can also store other information that relates to the reference fingerprint data, such as a title of the podcast series or episode in which the previously-detected repetitive content appeared.

In some examples, the database 116 and/or the indexer 118 can be included as part of the same computing system as the other components of the fingerprint matching subsystem 104. In other examples, the database 116 and/or the indexer 118 can be located remotely from the repetitive content detection system 100, such as part of a remotely-accessible server or other computing system.

Upon receiving the query fingerprint data, the fingerprint matching module 114 can communicate with the indexer 118 to retrieve reference fingerprint data from the database 116. To facilitate retrieval of useful reference fingerprint data from the database 116, the fingerprint matching module 114 can be configured to use various criteria for requesting reference fingerprint data. For example, the fingerprint matching module 114 can send a request to the indexer 118 to retrieve reference fingerprint data from the last 30 days, after which the indexer 118 will retrieve the requested reference fingerprint data from the database 116 and send the requested reference fingerprint data to the fingerprint matching module 114. In some examples, before the indexer 118 sends requested reference fingerprint data to the fingerprint matching module 114, the indexer 118 can be configured to organize the reference fingerprint data in a manner that allows for faster matching, such as by repetitive content type, episode release date, fingerprinting date, podcast series title, host, etc.

The fingerprint matching module 114 can compare at least a portion of the query fingerprint data and at least a portion of the reference fingerprint data to determine whether there is a match. The fingerprint matching module 114 can compare and match at least the portion of the query fingerprint data and at least the portion of the reference fingerprint data using any content fingerprint comparing and matching technique now known or later developed. An example fingerprint comparing and matching technique is described in U.S. Pat. No. 9,146,990 issued Sep. 29, 2015, the entirety of which is hereby incorporated by reference herein.

When the fingerprint matching module 114 detects a match between at least the portion of the query fingerprint data and at least the portion of the reference fingerprint data, the fingerprint matching module 114 can determine that at least a portion of the podcast content includes repetitive content. The fingerprint matching module 114 can then provide the repetitive content consolidation module 110 with labels identifying which segments of the podcast content, if any, are repetitive content segments. The fingerprint matching module 114 can also provide the repetitive content consolidation module 110 with other useful information, such as timestamps identifying when in the podcast content the repetitive content segments occur.

The fingerprint matching subsystem 104 is useful for detecting forms of repetitive content that do not vary much or at all across multiple episodes, and can advantageously detect exact or near-exact matches between repetitive content present in the podcast content and previously-detected repetitive content. For instance, the fingerprint matching subsystem 104 might detect repeating musical introductory themes or interludes with the same or higher confidence or accuracy than the audio feature matching subsystem 106 and/or the text matching subsystem 108. In addition, fingerprint matching can be done quickly across large catalogs of reference fingerprints, and can be faster and less costly than other forms of matching.

B. Audio Feature Matching Subsystem

Upon receiving the podcast content, the audio feature computation module 120 can take a plurality of time-windows of the podcast content (also referred to herein as "windows," for brevity), such as a series of N windows (e.g., $[W_1, W_2, W_3, \ldots W_N]$), and compute, for each window, a set of features of the audio in that window. Examples of such features can include, among other things, a power of the audio signal, a maximum pitch, a minimum pitch, a mean pitch, a maximum intensity, a minimum intensity, a mean intensity, a rate of speaking, a number of pauses or breaks, a duration of the pauses or breaks, a timbre, wavelet domain coefficients, and/or frequency domain features such as amplitude Fourier.

In some examples, the audio feature computation module 120 can divide the podcast content into a series of windows with equal duration. In other examples, the audio feature computation module 120 can use any previously-identified segments, pauses, breaks, or other information to divide the podcast content into windows and determine the duration of those windows. Further, at least two of the plurality of time-windows can overlap in some examples, whereas in other examples, no two time-windows of the plurality of time-windows can overlap. In an example, sliding windows with a hop size can be used, such as windows having a duration of ten seconds and a hop size of five seconds (e.g., $W_1$=0-10 seconds, $W_2$=5-15 seconds, $W_3$=10-20 seconds, etc.).

The audio feature matching module 122 receives the computed features from the audio feature computation module 120 and, for each time-window, compares the features for that time-window across at least one of the other time-windows. That is, the audio feature matching module 122 compares each time-window to at least one other time-window in the same podcast content.

Figure 3B:
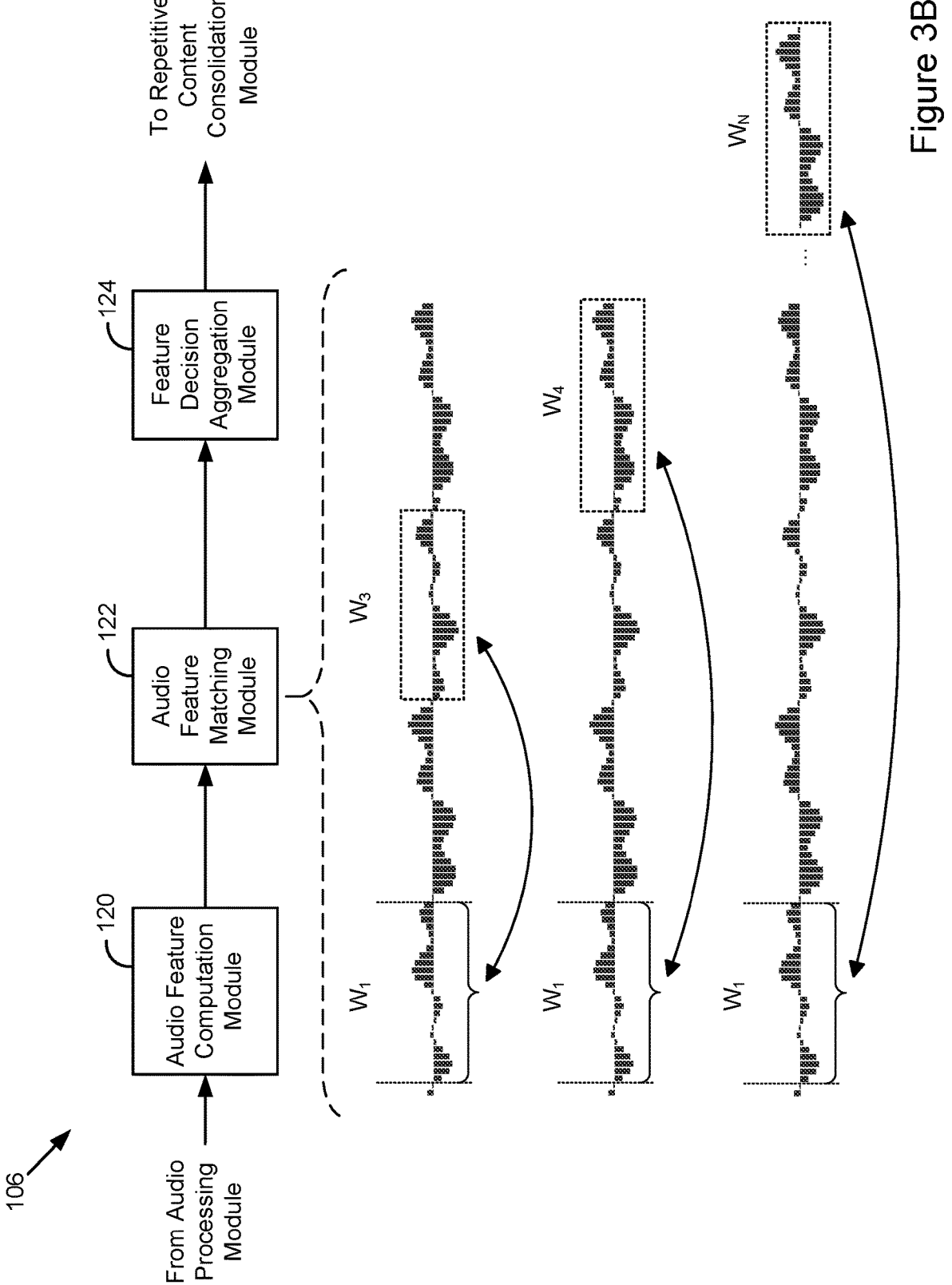
FIG. 3B illustrates example operations performed by the repetitive content detection system of FIG. 1.

FIG. 3B illustrates example operations performed by the audio feature matching subsystem 106, particularly the audio feature matching module 122. Given a series of N windows, $[W_1, W_2, W_3, \ldots W_N]$ of the podcast content and a set of three features, $[F_1, F_2, \text{ and } F_3]$, computed for each window, the audio feature matching module 122 can take $W_1$ and compare the three features of $W_1$ to the three features of $W_2$, then to the three features of $W_3$, and so on until $W_N$. FIG. 3B, for instance, shows portions of this processes where $W_1$ is compared to $W_3$, $W_4$, and $W_N$. In some examples, the comparison between two windows can involve, for each feature, calculating a difference, a distance, and/or some other parameter that represents the comparison between that feature in one window and that feature in the other window. As an example, the audio feature matching module 122 can compute the absolute value of the mean intensity of $W_1$ and calculate the difference between it and the absolute value of the mean intensity for each other window.

Based on the comparison of the feature(s) of one window to the corresponding feature(s) of the other window, the audio feature matching module 122 can determine whether any features of the two windows match, and in some cases, can calculate a similarity score between the two windows. This process can be repeated for each pair of windows until all of the windows have been compared. In some examples, when a feature from one window and the same feature from another window are compared, the audio feature matching module 122 can determine a match based on the two features having at least a threshold degree of similarity (e.g., mean intensity difference of less than a predefined threshold difference). Other criteria can be used to determine when a match has been found.

The feature decision aggregation module 124 can use at least a portion of the information determined by the audio feature matching module 122 to determine which of the matches are most likely to indicate repetitive content within the podcast content. The feature decision aggregation module 124 can then provide the repetitive content consolidation module 110 with labels identifying which segments (e.g., windows) of the podcast content, if any, are repetitive content segments that match to other such segments of the podcast content. The feature decision aggregation module 124 can also provide the repetitive content consolidation module 110 with other useful information, such as timestamps identifying when in the podcast content the repetitive content segments occur.

In an example of the above-described operations, the audio feature matching module 122 might determine that, for feature $F_1$, windows $W_1$, $W_3$, and $W_4$ match, and, for feature $F_2$, windows $W_2$, $W_3$, and $W_4$ match, and so on. The feature decision aggregation module 124 can then take these determinations and aggregate them into a single determination (e.g., labels indicating that, in the podcast content, repetitive content can be found at windows $W_1$, $W_2$, $W_3$, and $W_4$).

In another example of the above-described operations, the audio feature matching module 122 can determine a set of similarity scores, each of which representing a degree of similarity across all features of a pair of windows. For instance, if three of four features match between two windows, the similarity score for that pair of windows might be 75 out of 100. The feature decision aggregation module 124 can then take the set of similarity scores and compare each to a predefined similarity threshold that represents a degree of similarity at which the windows can be confidently labeled as repetitive content. If the similarity score for a pair of windows meets or exceeds the predefined similarity threshold, the feature decision aggregation module 124 can label the pair of windows as being representative of repetitive content and send the label to the repetitive content consolidation module 110.

In other examples, the audio feature matching module 122 can use at least a portion of the information described above along with a machine learning model, deep learning model, or other techniques or algorithms to determine which windows to label as repetitive content.

An advantage of audio feature matching is that it can provide the repetitive content detection system 100 with a way to find two instances of repetitive content in the podcast content that do not fully match each other, such as when one of the episode's hosts speaks a tagline at the beginning of the episode and a different host speaks the same tagline at the end of the episode. And as noted above, audio feature matching, along with text matching, can be more useful than fingerprint matching for detecting when spoken repetitive content is spoken over differing background music. Audio feature matching can also be effective for confidently detecting when a host speaks different sentences over the same background music, in which case a fingerprint match or a text match would not be found.

C. Text Matching Subsystem

Figure 3C:
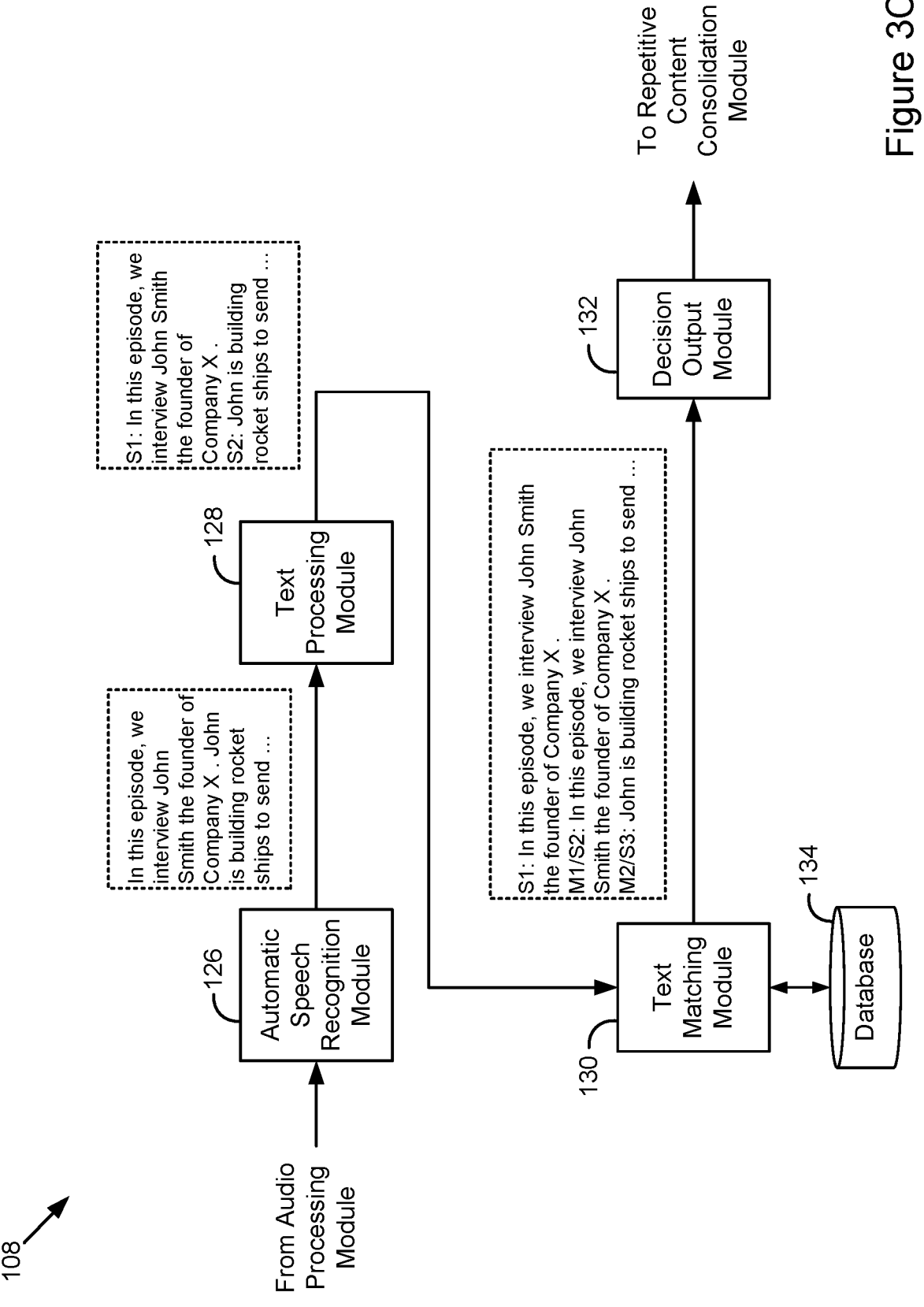
FIG. 3C illustrates example operations performed by the repetitive content detection system of FIG. 1.

FIG. 3C illustrates example operations performed by the text matching subsystem 108.

Upon receiving the podcast content, the ASR module 126 can transcribe at least a portion of the podcast content (e.g., at least a spoken word portion of the podcast content), and can generate a text file including the transcription. For example, the text file can begin with "In this episode, we interview John Smith, the founder of Company X. John is building rocket ships to send astronauts to the Moon. We asked John what he expects from the future of space travel, and whether he thinks we'll be colonizing the Moon within the next one hundred years."

For each of at least a subset of the spoken words detected in the podcast content, the ASR module 126 can determine for, and assign to, the spoken word, a respective text word (e.g., the words that make up the above-noted example text file), a respective word offset, a respective duration of the spoken word, and a respective confidence score. For example, using the example text file noted above, (i) the text word "In" might be assigned a word offset of 20 seconds (e.g., after a 20-second music introduction), a duration of 0.4 seconds, and a confidence score of 85 out of 100, (ii) the text word "this" might be assigned a word offset of 20.5 seconds, a duration of 0.6 seconds and a confidence score of 80 out of 100, and (iii) the text word "episode" might be assigned a word offset of 21.2 seconds, a duration of 1 second, and a confidence score of 99 out of 100. If the ASR module 126 assigns a confidence score that is below a predefined threshold (e.g., 70 out of 100), the ASR module 126 might flag a timestamp of the spoken word to indicate to other modules of the podcast summarization system 100 that the confidence is lower than other spoken words in the podcast content.

The text processing module 128 can receive the text file, word offsets, and/or word durations from the ASR module 126. The text processing module 128 can also receive the segment offsets, segment labels (e.g., music, speech, speaker), and sentence offsets from the audio processing module 102, either directly or via the ASR module 126. The text processing module 128 can then use at least a portion of the received information to divide the transcript in the text file into text sentences and label each text sentence in at least a portion of the text sentences with a respective speaker. The text processing module 128 can also use at least the word offsets and word durations to determine and/or verify timestamps of when text sentences in the transcript begin and end, and to distinguish the end of a sentence from a pause in the middle of a sentence.

In some examples, the received segment offsets and labels can include or indicate timestamps of when each music and speech segment begins and ends, as well as the identity of the speaker for each speech segment. This can enable the text processing module 128 to ignore music segments or other non-speech segments when determining how to divide up the transcript. Additionally, the text processing module 128 can use the speaker labels to insert a break in the text of the transcript that corresponds to when the speaker changes. In other words, using the speaker labels, the text processing module 128 can determine that, when the speaker changes (e.g., at a timestamp at which the audio processing module 102 determined a different speaker to now be speaking), one sentence ends and another sentence begins. The ability for the text processing module 128 to use the speaker labels can also be advantageous in that can help the text matching module 130 find a match for repetitive content. For instance, as described in more detail below, the text matching module 130 might have access to a database 134 that stores reference text sentences representing known repetitive content, and the database 134 might store, for each of one or more of the reference text sentences, a label or labels identifying the speaker or speakers for the repetitive content represented by the reference text sentence. Speaker labels can thus help the text matching module 130 to detect matches with higher confidence.

Furthermore, as noted above, the received sentence offsets can include or indicate respective start and/or end timestamps of when pauses occur, and the received word offsets can include or indicate respective start and/or end timestamps of when each word of at least a subset of the words in the transcript is spoken. The text processing module 128 can thus correlate the timestamps from at least the word offsets, segment offsets, and sentence offsets to divide the transcript into text sentences, determine timestamps of when the text sentences start and end in the podcast content, and label each text sentence with a speaker. As shown in FIG. 3C, for instance, a label for Speaker 1 is assigned to the sentence "In this episode, we interview John Smith, the founder of Company X," and a label for Speaker 2 is assigned to the sentence "John is building rocket ships to send . . . ."

As a more particular example of what can occur during the text processing process, based on the word offset for "episode" being 21.2 seconds, the first speech segment being between the 20-second mark and the 28-second mark of the podcast content, and Speaker 1 being assigned to the first speech segment, the text processing module 128 can determine that Speaker 1 speaks the word "episode" and that "episode" is part of a first sentence that is spoken before sentence offset $t_{sen\_1}$. Further, based on the word offset for "rocket" having a timestamp that falls within the duration of the second speech segment, and also based on Speaker 2 being assigned to the second speech segment, the text processing module 128 can determine that Speaker 2 speaks the word "rocket" and that "rocket" is part of a second sentence. A similar process can be performed for each of one or more other words in the transcript as well.

Additionally, in some examples, machine learning elements of the text processing module 128 can be trained to intelligently use the sentence offsets to add punctuation (e.g., commas, periods) between words and/or change punctuation that was included in the transcript by the ASR module 126 if such punctuation was incorrect. This can be particularly advantageous because it provides the text matching module 130 with text sentences that more accurately reflect the grammar and punctuation in what was spoken in the podcast content, thereby improving the quality of the set of text sentences from which the text matching module 130 selects sentences for inclusion in the audio summary. In alternative examples, the ASR module 126 can be configured such that the outputted transcript from the ASR module 126 does not include any punctuation.

In other examples, the text processing module 128 can be configured to refine the sentence offsets based on any detected discrepancy between timestamps. For example, if a sentence offset indicates that a sentence ends at the 57-second mark after the word "rocket" is spoken, but the word offset and/or word duration for "rocket" indicates high confidence that the word "rocket" was spoken until the 58-second mark, the sentence offset might be adjusted to a timestamp of 58 seconds.

Other techniques for dividing the transcript into sentences and labeling such sentences are possible as well and could be implemented by the text processing module 128. In some examples, the text processing module 128 might optionally be configured not to segment sentences by speaker and/or take into account grammar and punctuation, since the text matching module 130 can be configured to match sequences of words against others without needing to take into account speaker, grammar, and/or punctuation.

Having divided the transcript, the text processing module 128 can send, to the text matching module 130, a file representing the divided transcript. The text matching module 130 can then determine whether there are matches between text sentences from the file (also referred to herein as "query text sentences") and reference text sentences stored in the database 134, where each stored reference text sentence represents known repetitive content (e.g., a sentence from a tagline for the podcast episode) from previously-transcribed podcast content. In some examples, the database 134 can include an identifier of the type of repetitive content (e.g., advertisement, tagline, etc.), but in other examples, such an identifier might not be known. Further, in some examples, the database 134 can store, additionally or alternatively to raw references text sentences, a hash or other representation of each reference text sentence, which can reduce the amount of storage space required for the reference text sentences and can make lookup of such reference text sentences more efficient.

Although "text sentences" or "query text sentences" can be actual sentences detected via a processing of the transcript, taking into account grammar, punctuation, etc., it should be understood that a "text sentence" or "query text sentence" can alternatively be a window of words or characters. For example, the text matching module 130 can take multiple overlapping or non-overlapping windows of words, each having a particular number of words (e.g., ten), and match each against reference text sentences. As another example, the text matching module 130 can take multiple overlapping or non-overlapping windows of characters, each having a particular number of characters (e.g., fifty), and match each against reference text sentences. Other examples are possible as well.

The act of the text matching module 130 determining whether a particular query text sentence matches a reference text sentence can involve, for instance, determining how many words are present in both the query text sentence and the reference text sentence. If at least a threshold quantity of the same words appear in both sentences, the text matching module 130 can determine that a match has been detected and responsively then generate a label for the query text sentence to identify the query text sentence as potential repetitive content that has matched known repetitive content. As shown in FIG. 3C, for instance, the output sent from the text matching module 130 to the decision output module 132 identifies one text sentence in the transcript as a first sentence (i.e., "M1") of the transcript that has matched a reference text sentence and identifies another text sentence in the transcript as a second sentence (i.e., "M2") of the transcript that has matched a reference text sentence. Additionally or alternatively, if the threshold quantity is met or exceeded, the text matching module 130 can store an indication of how many word matches were detected. In some examples, the act of the text matching module 130 determining whether a particular query text sentence matches a reference text sentence can involve determining whether the matching words occur in the same sequential order in both the query text sentence and the reference text sentence. Other techniques for comparing and matching a query text sentence and a reference text sentences are possible as well.

In some examples, the text matching module 130 can be configured to ignore certain keywords or characters when determining whether a query text sentence and a reference text sentence match. Such keywords can be stored in database 134 for reference, and can include common words (e.g., "the," "and", "it") and/or any other words included on a predefined list of words.

In some examples, the text matching module 130 can determine a similarity score or other value that represents the similarity between a query text sentence and a reference text sentence. As an example, if 85% of the words match between the query text sentence and the reference text sentence, not including any keywords that the text matching module 130 might be configured to ignore, the text matching module 130 can determine the similarity score to be 85 out of 100. As another example, if 85% of the characters match between the query text sentence and the reference text sentence, not including any characters that the text matching module 130 might be configured to ignore, the text matching module 130 can determine the similarity score to be 85 out of 100. Other examples are possible as well.

Other information can be taken into account when comparing query text sentences and reference text sentences as well, and at least a portion of such information can be mapped to respective reference text sentences in the database 134 and used as an additional basis for determining a match or for associating a higher confidence score to a determined match. For example, as noted above, the database 134 might store, for each of one or more of the reference text sentences, a label or labels identifying the speaker or speakers for the repetitive content represented by the reference text sentence. The stored labels can be compared and matched with any known speaker labels associated with the query text sentences.

As another example, the database 134 can store, for each of one or more of the reference text sentences, sentence offsets, word offsets, and/or any of the other information described above that might have been previously determined by the repetitive content detection system 100 for the reference text sentences or that might have been provided to the database 134 as training data.

As yet another example, the database 134 can store, for one or more of the reference text sentences, a corresponding audio file that includes at least a portion of podcast content that the reference text sentence represents, such as an audio clip of an advertisement or an audio clip of a musical theme. Other examples are possible as well.

The reference information stored in database 134 and database 116 can enable the repetitive content detection system 100 to, over time, identify and make a record of repetitive content in podcast episodes for use as reference when detecting repetitive content in other podcast episodes.

The decision output module 132 can receive match results and associated information from the text matching module 130. For example, the decision output module 132 can receive an indication of each query text sentence that matches a reference text sentence, as well as any similarity score or other measurement determined by the text matching module 130. The decision output module 132 can then select, from the matched query text sentences, which text sentences to label as repetitive content and send to the repetitive content consolidation module 110. As an example, the decision output module 132 can be configured to only label a matched query text sentence as repetitive content if the match has a similarity score that meets or exceeds a predefined threshold similarity score (e.g., a similarity score of 85 out of 100, corresponding to 85% of words matched). Other techniques for selecting which query text sentences to label as repetitive content are possible as well.

The decision output module 132 can then provide the repetitive content consolidation module 110 with the labels identifying which text sentences of the podcast content, if any, represent repetitive content segments. In some examples, the decision output module 132 can use timestamps associated with the text sentences or the words thereof to provide labels in the audio domain in addition to or alternative to the text domain. That is, the decision output module 132 can use the timestamps to generate and send to the repetitive content consolidation module 110 labels identifying which segments of the podcast content (that is, which audio segments of the podcast content) are repetitive content segments. The decision output module 132 can also provide the repetitive content consolidation module 110 with other useful information, such as the timestamps identifying when in the podcast content the repetitive content segments occur.

D. Repetitive Content Consolidation

Figure 3D:
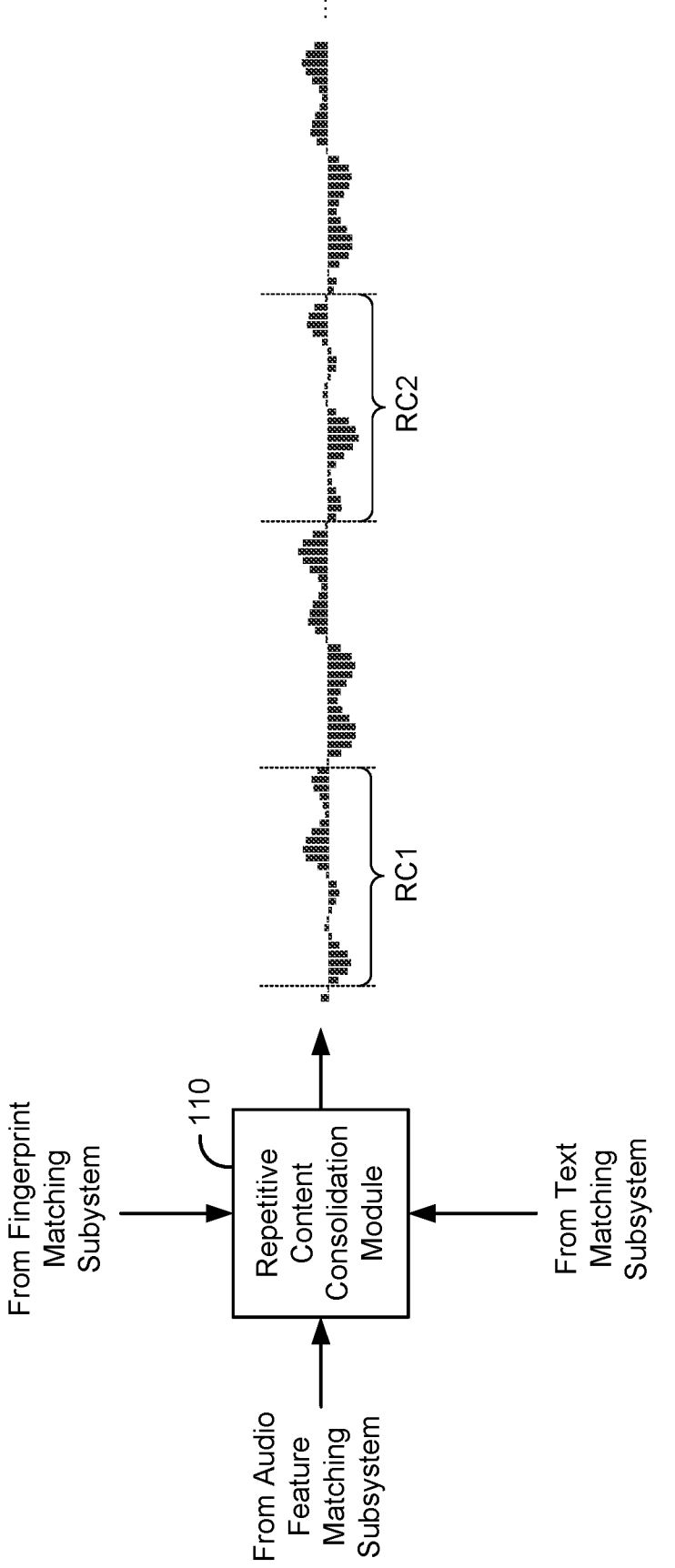
FIG. 3D illustrates example operations performed by the repetitive content detection system of FIG. 1.

FIG. 3D illustrates example operations performed by the repetitive content consolidation module 110.

Upon receiving the labels and any other information (e.g., the timestamps, similarity scores, etc.) from the three subsystems, the repetitive content consolidation module 110 can use at least a portion of the labels or the other information to generate and provide a system output that identifies detected repetitive content in the podcast content. For example, the repetitive content consolidation module 110 can select, from the received labels, a set of labels to include in the system output. The system output, in some examples, can include (i) an audio file for the podcast content (or just the audio for portions that represent the repetitive content) and (ii) metadata that includes the selected labels and the timestamps for the repetitive content. As a representative example, FIG. 3D shows a portion of the audio file for the podcast content along with labels, RC1 and RC2, identifying two of the detected repetitive content segments within the podcast file.

To facilitate selection of the repetitive content labels from the labels received from the three subsystems, the repetitive content consolidation module 110 can use one or more of a variety of techniques and/or algorithms to classify labels, including but not limited to machine learning, a neural network, random decision forest, support vector machine, and/or a heuristic algorithm.

Furthermore, in some examples, the repetitive content consolidation module 110 can be configured to select or not select a particular repetitive content segment based on the segment meeting or not meeting a set of criteria. As an example, the set of criteria can include a condition that the repetitive content segment was identified as such by at least two of the three subsystems. Consider, for instance, the following scenario. The labels from the fingerprint matching subsystem 104 might indicate that, of the first four sentences of the podcast content, sentences 1, 3, and 4 are repetitive content across multiple episodes. The labels from the text matching subsystem 108, on the other hand, might indicate that, of those same four sentences, sentences 1, 2, and 4 are repetitive content across multiple episode. In this scenario, the repetitive content consolidation module 110 might select sentences 1 and 4 to include in the system output and thus identify as repetitive content detected in the podcast content. As another example, the set of criteria can include a condition that the repetitive content segment was identified with at least a predefined threshold confidence.

As another example scenario, the labels for two of the three subsystems might indicate that sentences 2, 3, and 6 are repetitive content, and the remaining subsystem might indicate that sentences 4 and 5 are repetitive content. In this scenario, even though only one of the subsystems labeled sentences 4 and 5 as repetitive content (and even if the other two subsystems expressly rejected sentences 4 and 5 as repetitive content for one reason or another), the repetitive content consolidation module 110 might still select sentences 4 and 5 if the confidence level or other determined measurement with respect to sentences 4 and 5 exceeds a particular threshold. Other examples are possible as well.

In some examples, the repetitive content consolidation module 110 can be configured to use predefined or dynamically-modifiable weight values to determine which segments are repetitive content. As an example, a predefined weight value for the fingerprint matching subsystem 104 might be greater than a predefined weight value for the text matching subsystem 108, and the predefined weight value for the text matching subsystem 108 might be greater than a predefined weight value for the audio feature matching subsystem 106.

Consider for instance an embodiment in which ($m_1$, $m_2$, $m_3$) represents the decisions made by the fingerprint matching subsystem 104, the audio feature matching subsystem 106, and the text matching subsystem 108, respectively. In this embodiment, the final decision as to which segments to select can be determined as a weighted sum (i.e., $w_1*m_1$, $+w_2*m_2+w_3*m_3$), where $w_1$, $w_2$, and $w_3$ represent the weight values for the fingerprint matching subsystem 104, the audio feature matching subsystem 106, and the text matching subsystem 108, respectively. The weighted values can be equal weight (i.e., $w_1=W_2=w_3=0.333$), or can be computed based on the respective confidences with which each subsystem has identified potential repetitive content. In an example, if the fingerprint matching subsystem 104 and the audio feature matching subsystem 106 have identified a segment as repetitive content with high confidence, but the text matching subsystem 108 has not identified that segment as repetitive content, $w_1$ and $w_2$ might each be 0.5, and $w_3$ might be 0. The weight values can be learned through a model and can have a value between zero and one as long as the sum of the three weight values equals one. Additionally or alternatively, the weight values can be a ratio of the confidence, similarity, or other type of decision scores from the three subsystems.

In some examples, additionally or alternatively to outputting a set of selected labels, the repetitive content consolidation module 110 or other module of the repetitive content detection system 100 can be configured to remove or perform another action with respect to the repetitive content segments in the podcast content. As an example, upon selecting the labels, the repetitive content detection system 100 can deliver, or facilitate delivery of, the system output to another computing system of the content distribution system or to a client device.

The labels selected by the repetitive content consolidation module 110 and output by the repetitive content detection system 100 selected by the can be used by other computing systems as a basis for performing other operations relative to the podcast content. As an example, a podcast summarization system can be configured to process podcast content in the text domain and/or the audio domain and can use the labels as a basis to take certain action with respect to the repetitive content detected in the podcast content, such as using the labels (and timestamps and/or other information in the system output) to ignore or remove repetitive content when creating a text and/or audio summary of the podcast content. To facilitate this, the repetitive content detection system 100 could be located upstream (e.g., in the order in which incoming podcast content is processed) from such a podcast summarization system, or can be part of the podcast summarization system itself.

As another example of how the repetitive content detection system 100 can improve podcast summarization, the repetitive content detection system 100 can be configured to find the indices of sentences in a transcript of podcast content that are, or are included as part of, repetitive content segments (e.g., [0, 1, 2, 3, 4, 6, 7, 30, 31, 32, 48], where each number corresponds to a sentence in the transcript in the sequential order in which the sentences appear in the transcript). The repetitive content detection system 100 can then clean up the indices (i) to merge any near-by indices (e.g., [0, 1, 2, 3, 4] with [6, 7]) into one large set of indices and (ii) to remove any outliers (e.g., [48]). Such repetitive content can be stored for use in data augmentation for training machine learning elements in the podcast summarization system, so that one or more of the modules can be trained to remove repetitive content, ignore repetitive content, or perform some other action with respect to repetitive content). To generate an augmented output for use in the training phase, for example, the repetitive content detection system 100 or the podcast summarization system can be configured to replace a segment of repetitive content detected in an episode of a podcast with different, randomly-selected segment of repetitive content to create a new data sample. Multiple different new samples can be created in this manner and added to the training set of data used during the training phase to increase the diversity of the data used to train the machine learning elements of the modules.

In some embodiments, the repetitive content consolidation module 110 and/or other modules described herein can be further configured to predict the type of repetitive content for a particular segment that has been identified as repetitive content. As an example, the repetitive content consolidation module 110 can store data that indicates a frequency at which a particular type of segment typically appears in podcast content. For instance, an announcement might typically appear in a given podcast series for only a few weeks. The repetitive content consolidation module 110 might determine (e.g., using time-stamps associated with the repeated detection of the segment, as well as data that identifies the podcast content and the series to which it belongs) that a particular segment in the podcast content has been identified as repetitive content has only appeared for a few weeks in a row in a particular podcast series and can refer to the stored data to predict that the particular segment is an announcement. Other examples are possible as well.

In some embodiments, the absence of a match between segments of the podcast content and previous podcast content can be informative to the repetitive content detection system 100, including in situations where advertisements or other repetitive content are dynamically inserted into podcast content, for instance. In such situations, the repetitive content detection system 100 can receive the podcast content and have access to (e.g., download) a previous version of the podcast content (e.g., a version of the podcast content that the repetitive content detection system 100 downloaded the previous week or month). Between the podcast content and the previous version of the podcast content, the main content can be unchanged, and thus while segments corresponding to the different advertisements or other repetitive content between the two might not match, a large portion (e.g., 75% or more) of the podcast content and the previous version of the podcast content might match. Thus, the repetitive content detection system 100 may detect positive matches between segments of the podcast content and the previous podcast content that correspond to the main content present in both the podcast content and the previous podcast content, and might not detect matches for segments that correspond to the advertisements and/or other types of repetitive content that are present in the podcast content but not present in the previous podcast content. When this occurs, the repetitive content detection system 100 can be configured to label the segments of the podcast episode for which no match was detected as repetitive content segments.

In some situations, a podcast series can feature "guest" episodes from a different podcast series, or older episodes of the podcast series are re-broadcasted (often with new advertisements). In a re-broadcasted podcast episode and/or a guest episode, the beginning or end segments of the episode might have unique content that is not present in the original episode (e.g., "In this episode of Podcast X, we are featuring an episode by our friends at Podcast Y, where they talked about . . . ", or "This episode of Podcast X originally aired in 2017, and we will have a quick update at the end of the show."). Compared to the situations described above in which advertisements or other repetitive content is dynamically inserted into podcast content, guest episodes and re-broadcasted episodes might have less content, but still a large amount of content, that matches the original episode. In these situations, the repetitive content detection system 100 might detect matches between segments of two instances of the same podcast content (e.g., the same podcast episode, perhaps with different advertisements), and it might not be desirable for the purposes of the repetitive content detection system 100 to label such matching segments as repetitive content. Thus, the repetitive content detection system 100 can refer to the metadata associated with the podcast content, which can indicate whether particular podcast content is a guest episode from a different podcast series or a re-broadcast of podcast content, and perform certain actions based on the determination made from the metadata, such as not labeling some or all segments of the podcast content as repetitive content. Additionally or alternatively, the repetitive content detection system 100 can determine whether at least a particular threshold of the podcast content matched with reference podcast content (e.g., at least a 50% match) and, if the particular threshold is met or exceeded, the repetitive content detection system 100 can responsively assign a special label to the podcast content to indicate that the podcast content is predicted to be a re-broadcast of previous podcast content and/or can perform other responsive actions as well, such as deciding not to store a record of any matched segments from that podcast content.

IV. Example Method

Figure 4B:
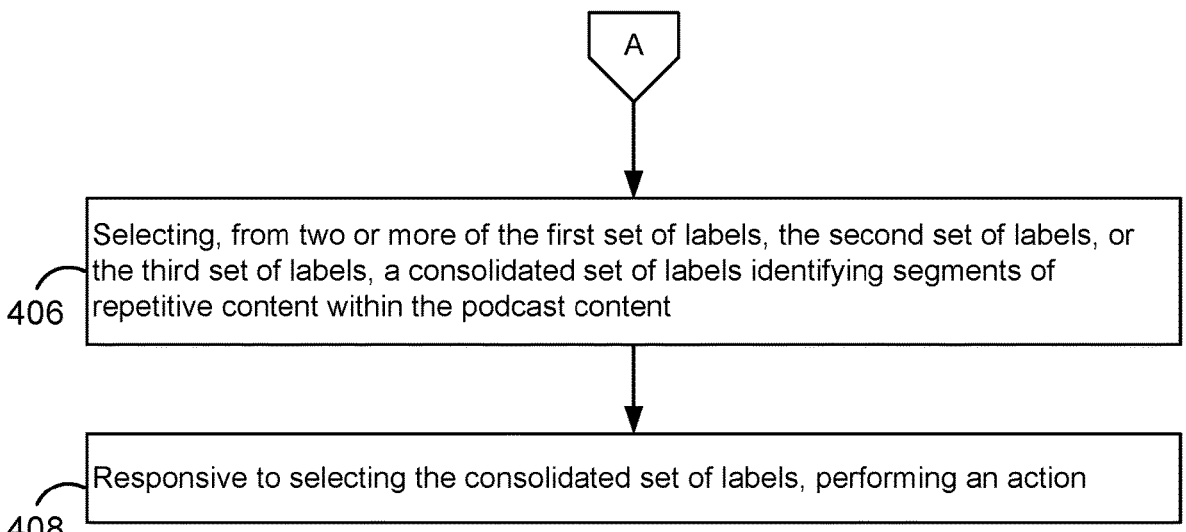
FIG. 4B is a flow chart of an example method.

FIGS. 4A and 4B are a flow chart of an example method 400. At block 402, the method 400 includes receiving podcast content.

At block 404, the method 400 includes identifying potential repetitive content within the podcast content by performing two or more of a first set of acts, a second set of acts, or a third set of acts. The first set of acts includes detecting a fingerprint match between query fingerprint data representing at least one audio segment within the podcast content and reference fingerprint data representing known repetitive content within other podcast content, the other podcast content being different from the podcast content, where the known repetitive content comprises content segments that repeatedly appear in the other podcast content. The first set of acts also includes responsive to detecting the fingerprint match, generating a first set of labels identifying the at least one audio segment as potential repetitive content within the podcast content. The second set of acts includes for each of a plurality of time-windows of the podcast content, determining a set of audio features, where each of the sets of audio features include the same audio feature types. The second set of acts also includes detecting a feature match between the set of audio features of at least one time-window of the plurality of time-windows and the set of audio features of at least one other time-window of the plurality of time-windows. The second set of acts also includes responsive to detecting the feature match, generating a second set of labels identifying the at least one time-window as potential repetitive content within the podcast content. The third set of acts includes generating a transcript of at least a portion of the podcast content. The third set of acts also includes dividing the generated transcript into query text sentences. The third set of acts also includes detecting a text match between at least one of the query text sentences and reference text sentences, the reference text sentences comprising text sentences from the known repetitive content within the other podcast content. The third set of acts also includes responsive to detecting the text match, generating a third set of labels identifying at least one audio segment of the podcast content that corresponds to the at least one of the query text sentences as potential repetitive content within the podcast content.

At block 406, the method 400 includes selecting, from two or more of the first set of labels, the second set of labels, or the third set of labels, a consolidated set of labels identifying segments of repetitive content within the podcast content.

At block 408, the method 400 includes responsive to selecting the consolidated set of labels, performing an action.

The method 400 and related acts can be performed at least in part by any one or more components of the repetitive content detection system 100. In some embodiments, for instance, the method 400 can be performed by a server computing system of a content distribution system that maintains and provides access to the podcast content and includes the repetitive content detection system 100. Additionally or alternatively, in some embodiments, the method 400 can be performed by a client device that includes the repetitive content detection system 100.

In some embodiments, the audio feature types can include one or more of: a power of an audio signal, a pitch, an intensity, a rate of speaking, or a timbre.

In some embodiments, the second set of acts can also include for each of the plurality of time-windows, comparing the time-window to each other time-window of the plurality of time-windows, where detecting the feature match is based on the comparing.

In some embodiments, the third set of acts can also include detecting a speaker match between at least one speaker associated with the at least one of the query text sentences and speaker identifiers associated with at least one of the reference text sentences, where generating the third set of labels is further responsive to detecting the speaker match.

In some embodiments, the third set of acts can also include determining a similarity score between each of the at least one query text sentences and a respective one of the reference text sentences that matches the query text sentence, where generating the third set of labels is further responsive to each of the similarity scores exceeding a predefined threshold similarity.

In some embodiments, the act of selecting the consolidated set of labels can include determining that two or more of the first set of labels, the second set of labels, or the third set of labels include one or more labels that identify one or more segments of the podcast content as potential repetitive content, and responsive to determining that two or more of the first set of labels, the second set of labels, or the third set of labels include the one or more labels that identify the one or more segments of the podcast content as potential repetitive content, selecting the one or more labels to include in the consolidated set of labels.

In some embodiments, the act of performing the action can include transmitting the selected consolidated set of labels to a client device.

In some embodiments, the act of performing the action can include performing an action that facilitates a computing device generating an audio summary of the podcast content or a text summary of the podcast content.

In some embodiments, the act of identifying potential repetitive content within the podcast content by performing two or more of the first set of acts, the second set of acts, or the third set of acts can include identifying potential repetitive content within the podcast content by performing the first set of acts, the second set of acts, and the third set of acts.

In some embodiments, the podcast content can be or include an advertisement in which a speaker is speaking over background music. In such embodiments, the act of identifying potential repetitive content within the podcast content by performing two or more of the first set of acts, the second set of acts, or the third set of acts can include identifying potential repetitive content within the podcast content by performing the second set of acts and one or more of the first set of acts or the third set of acts, where the second set of labels includes a label identifying at least one time-window corresponding to the advertisement as potential repetitive content.

V. Example Variations

Although the examples and features described above have been described in connection with specific entities and specific operations, in practice, there are likely to be many instances of these entities and many instances of these operations being performed, perhaps contemporaneously or simultaneously, on a large-scale basis. Indeed, in practice, the content-modification system 100 is likely to include many content-distribution systems (each potentially transmitting content on many channels) and many content-presentation devices, with some or all of the described operations being performed on a routine and repeating basis in connection with some or all of these entities.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:

detecting a match between a segment of a first podcast content and known repetitive content within a second podcast content, wherein the known repetitive content appears at least twice in the second podcast content;

responsive to detecting the match, generating a label identifying the segment as potential repetitive content within the first podcast content; and responsive to generating the label, performing an action, wherein performing the action comprises performing the action such that the action facilitates a computing device (a) generating an audio summary of the first podcast content that does not include the segment or (b) generating a text summary of the first podcast content that does not include text corresponding to the segment.

2. The method of claim 1, further comprising:

detecting a second match between audio features of a first portion of the first podcast content and audio features of a second portion of the first podcast content, wherein the audio features comprise one or more of: an audio power, a pitch, an intensity, a rate of speaking, or a timbre; and responsive to detecting the second match, generating a second label identifying the first portion as potential repetitive content within the first podcast content.

3. The method of claim 1, further comprising:

detecting a feature common to a first portion of the first podcast content and a second portion of the first podcast content; and responsive to detecting the feature, generating a second label identifying the first portion as potential repetitive content within the first podcast content.

4. The method of claim 1, further comprising:

generating a transcript of the segment;

dividing the transcript into query text sentences;

detecting a second match between one of the query text sentences and reference text sentences, the reference text sentences comprising text sentences from the known repetitive content; and responsive to detecting the second match, generating a second label identifying the segment as potential repetitive content within the first podcast content.

5. The method of claim 4, further comprising:

making a determination that similarity scores between each of the query text sentences and a respective one of the reference text sentences exceeds a threshold,

wherein generating the second label comprises generating the second label responsive to making the determination.

6. The method of claim 1, wherein performing the action comprises transmitting the label to a client device.

7. The method of claim 1, wherein detecting the match comprises detecting the match based on words of the segment and respective timestamps.

8. A non-transitory computer readable medium storing instructions that, when executed by a server device, cause the server device to perform functions comprising:

detecting a match between a segment of a first podcast content and known repetitive content within a second podcast content, wherein the known repetitive content appears at least twice in the second podcast content;

responsive to detecting the match, generating a label identifying the segment as potential repetitive content within the first podcast content; and responsive to generating the label, performing an action, wherein performing the action comprises performing the action such that the action facilitates a computing device (a) generating an audio summary of the first podcast content that does not include the segment or (b) generating a text summary of the first podcast content that does not include text corresponding to the segment.

9. The non-transitory computer readable medium of claim 8, the functions further comprising:

detecting a second match between audio features of a first portion of the first podcast content and audio features of a second portion of the first podcast content, wherein the audio features comprise one or more of: an audio power, a pitch, an intensity, a rate of speaking, or a timbre; and responsive to detecting the second match, generating a second label identifying the first portion as potential repetitive content within the first podcast content.

10. The non-transitory computer readable medium of claim 8, the functions further comprising:

detecting a feature common to a first portion of the first podcast content and a second portion of the first podcast content; and responsive to detecting the feature, generating a second label identifying the first portion as potential repetitive content within the first podcast content.

11. The non-transitory computer readable medium of claim 8, the functions further comprising:

generating a transcript of the segment;

dividing the transcript into query text sentences;

detecting a second match between one of the query text sentences and reference text sentences, the reference text sentences comprising text sentences from the known repetitive content; and responsive to detecting the second match, generating a second label identifying the segment as potential repetitive content within the first podcast content.

12. The non-transitory computer readable medium of claim 11, the functions further comprising:

making a determination that similarity scores between each of the query text sentences and a respective one of the reference text sentences exceeds a threshold, wherein generating the second label comprises generating the second label responsive to making the determination.

13. The non-transitory computer readable medium of claim 8, wherein performing the action comprises transmitting the label to a client device.

26

14. A server device comprising:

a processor; and a computer readable medium storing instructions that, when executed by the processor, cause the server device to perform functions comprising:

detecting a match between a segment of a first podcast content and known repetitive content within a second podcast content, wherein the known repetitive content appears at least twice in the second podcast content;

responsive to detecting the match, generating a label identifying the segment as potential repetitive content within the first podcast content; and responsive to generating the label, performing an action, wherein performing the action comprises performing the action such that the action facilitates a computing device (a) generating an audio summary of the first podcast content that does not include the segment or (b) generating a text summary of the first podcast content that does not include text corresponding to the segment.

15. The server device of claim 14, the functions further comprising:

detecting a second match between audio features of a first portion of the first podcast content and audio features of a second portion of the first podcast content, wherein the audio features comprise one or more of: an audio power, a pitch, an intensity, a rate of speaking, or a timbre; and responsive to detecting the second match, generating a second label identifying the first portion as potential repetitive content within the first podcast content.

16. The server device of claim 14, the functions further comprising:

detecting a feature common to a first portion of the first podcast content and a second portion of the first podcast content; and responsive to detecting the feature, generating a second label identifying the first portion as potential repetitive content within the first podcast content.

17. The server device of claim 14, the functions further comprising:

generating a transcript of the segment;

dividing the transcript into query text sentences;

detecting a second match between one of the query text sentences and reference text sentences, the reference text sentences comprising text sentences from the known repetitive content; and responsive to detecting the second match, generating a second label identifying the segment as potential repetitive content within the first podcast content.

18. The server device of claim 17, the functions further comprising:

making a determination that similarity scores between each of the query text sentences and a respective one of the reference text sentences exceeds a threshold, wherein generating the second label comprises generating the second label responsive to making the determination.

19. The server device of claim 14, wherein performing the action comprises transmitting the label to a client device.

20. The server device of claim 14, wherein detecting the match comprises detecting the match based on words of the segment and respective timestamps.

\* \* \* \* \*